United States Patent [19]
Bauer

[11] Patent Number: 5,695,793
[45] Date of Patent: Dec. 9, 1997

[54] INJECTION MOLDING VALVE MEMBER WITH HEAD AND NECK PORTIONS

[75] Inventor: Klaus Bauer, Neuendette, Germany

[73] Assignee: Mold-Masters Limited, Georgetown, Canada

[21] Appl. No.: 662,004

[22] Filed: Jun. 12, 1996

[30] Foreign Application Priority Data

May 2, 1996 [CA] Canada ............................ 2175634

[51] Int. Cl.⁶ ............................................. B29C 45/23
[52] U.S. Cl. ..................... 425/564; 264/328.9; 425/566
[58] Field of Search ............................ 425/562, 563, 425/564, 565, 566; 264/328.9

[56] References Cited

U.S. PATENT DOCUMENTS

| | | |
|---|---|---|
| 4,013,393 | 3/1977 | Gellert. |
| 4,285,661 | 8/1981 | Yotsutsuji et al. ............... 425/566 |
| 4,521,179 | 6/1985 | Gellert. |
| 4,781,572 | 11/1988 | Boring ............................... 425/564 |
| 5,002,480 | 3/1991 | Gellert et al.. |
| 5,423,672 | 6/1995 | Gordon ............................... 425/564 |

*Primary Examiner*—Tim Heitbrink
*Attorney, Agent, or Firm*—Dalesmand & Company

[57] ABSTRACT

An injection molding valve member having a smaller neck portion leading to a short head portion. This facilitates the backflow of melt around the head portion as the valve member is driven forwardly to the closed position. In one embodiment, the neck portion is formed by a number of flutes spaced around the valve member having lands between them.

4 Claims, 3 Drawing Sheets

INJECTION MOLDING VALVE MEMBER WITH HEAD AND NECK PORTIONS

BACKGROUND OF THE INVENTION

This invention relates generally to injection molding and more particularly to valve gated apparatus having an elongated valve member with a neck portion leading to a head portion at the front end.

Valve gated injection molding apparatus is well known. Usually the valve member has a cylindrical or tapered front end and reciprocates between a retracted open position and a forward closed position in which the front end is seated in the gate. An example of this is shown in U.S. Pat. No. 4,013,393 to Gellert which issued Mar. 22, 1977. As the valve pin is driven forward to the closed position, some of the melt displaced by the valve pin must flow backwards around the valve pin to enable it to close. While valve members having a cylindrical or tapered front end are satisfactory for many applications, they have the disadvantage that backflow is very restricted between the front end of the valve member and surrounding gate. This results in a build up of back pressure in the melt as the valve member is driven forwardly. It is very difficult to find the right timing of closing the valve member, particularly when molding crystalline materials which solidify much faster than amorphous materials. If the timing is not correct the valve member can act like an injector and push material into a semi-solidified part which results in a product which is stressed and therefore a reject. Improving the melt backflow as the valve member advances to the closed position makes the exact timing of closing less critical and somewhat overcomes this problem. Also, in some cases the build up of back pressure in the melt prevents the valve member advancing to be completely seated in the gate and thus does not provide the molded product with a cosmetically clean gate mark. While additional force can be applied to the valve member to try to overcome the back pressure problem, this results in increasing wear and malfunction of the actuating mechanism.

In some applications the valve member functions in the reverse direction and closes in the retracted position. One example of this is shown in U.S. Pat. No. 4,521,179 to Gellert which issued Jun. 4, 1985. While this shows a valve member with head and neck portions, the head must be long enough to extend entirely through the cavity in this core ring gate application and thus would be of no benefit in the present application. Another example of reverse gating is shown in U.S. Pat. No. 5,002,480 to Gellert et al. which issued Mar. 26, 1991. This shows a valve member with a head which tapers to a sharp edge and thus could not be self aligning as in the present application.

SUMMARY OF THE INVENTION

Accordingly, it is an object of the present invention to at least partially overcome the disadvantages of the prior art by providing valve gated apparatus having a valve member having head and neck portions which facilitate melt backflow as the valve member is driven forwardly to the closed position.

To this end, in one of its aspects, the invention provides a valve gated injection molding apparatus to convey melt to a gate extending through a mold to a cavity comprising a heated nozzle seated in the mold, the nozzle having a rear end, a front end, and a melt bore extending therethrough from the rear end to the front end in alignment with the gate, an elongated valve member having a front end mounted to extend centrally in the melt bore through the nozzle, and valve member actuating means connected to the valve member whereby the valve member is reciprocated between a retracted open position wherein the melt flows from the melt bore through the gate into the cavity and a forward closed position wherein the front end of the valve member is seated in the gate, having the improvement wherein the elongated valve member has a short cylindrical head portion with a uniform diameter at the front end and a neck portion extending rearwardly from the head portion, the neck portion being substantially smaller in cross-sectional area than the head portion.

Further objects and advantages of the invention will appear from the following description taken together with the accompanying drawings.

DETAILED DESCRIPTION OF THE INVENTION

Figure 1:
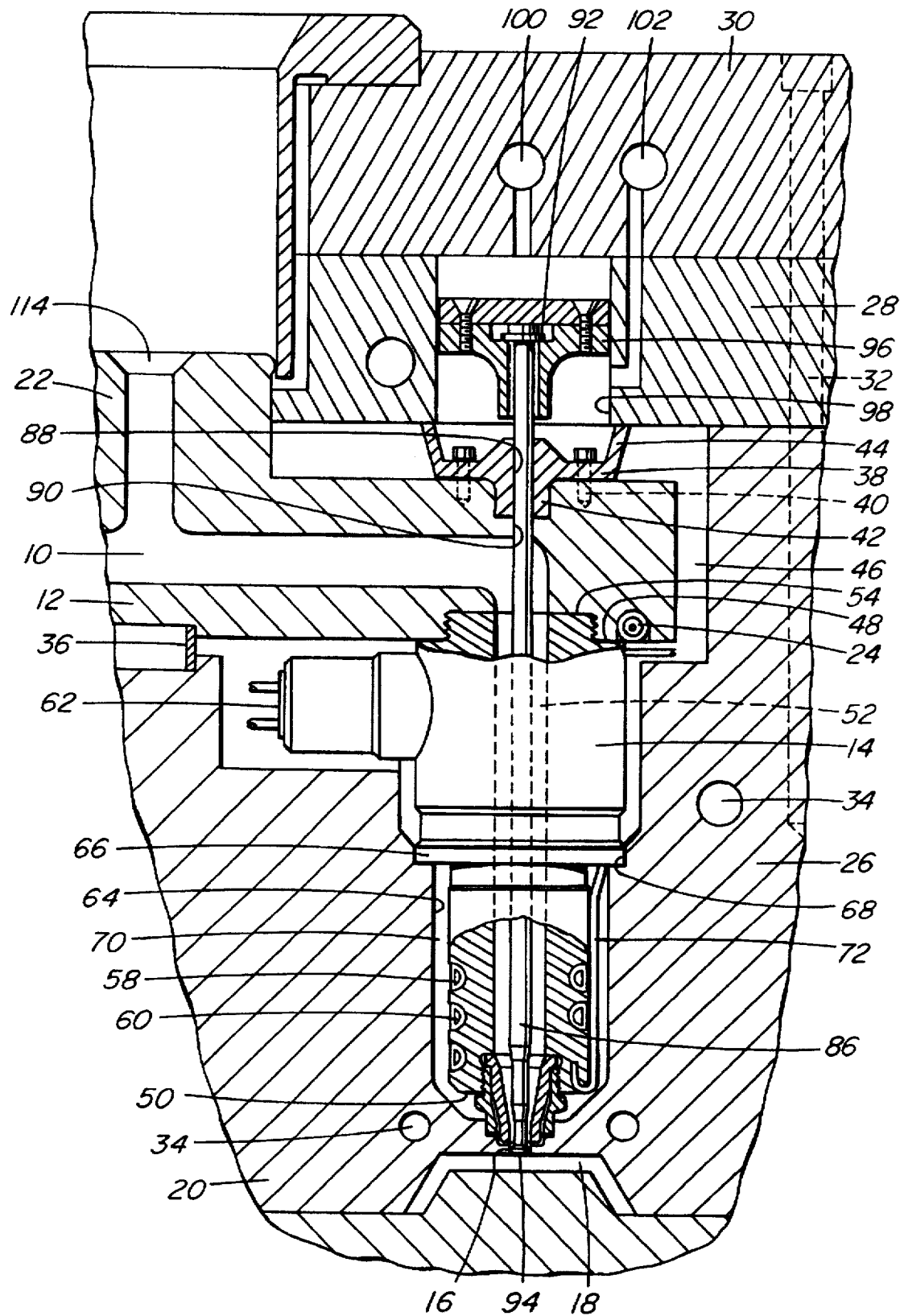
FIG. 1 is a sectional view of a portion of a multi-cavity valve gated injection molding system showing apparatus according to one embodiment of the invention with the valve member in the closed position.

Reference is first made to FIG. 1 which shows a portion of a multi-cavity valve gated injection molding system or apparatus having a melt passage 10 extending through a steel melt distribution manifold 12 and several steel nozzles 14 to convey pressurized melt to respective gates 16 leading to different cavities 18 in a mold 20. The melt distribution manifold 12 has a cylindrical inlet portion 22 and is heated by an integral heating element 24. While the mold 20 usually has a greater number of plates depending upon the application, in this case only a cavity plate 26, a cylinder plate 28 and a back plate 30 which are secured together by screws 32 are shown for ease of illustration. The mold 20 is cooled by pumping cooling water through cooling conduits 34. The melt distribution manifold 12 is mounted between the cavity plate 26 and the cylinder plate 28 by a central locating ring 36 and sealing bushings 38. Each sealing bushing 38 is secured by screws 40 in a matching seat 42 in the manifold 12 and has a flanged portion 44 which bears against the cylinder plate 28. Thus, an insulative air space 46 is provided between the heated manifold 12 and the surrounding cooled mold 20.

Each nozzle 14 has a rear end 48, a front end 50 and a central melt bore 52 extending from the rear end 48 to the front end 50. A threaded nipple 54 at the rear end 48 is screwed into the manifold 12 to secure the nozzles 14 to the front face 56 of the manifold 12. The nozzle 14 is heated by an electrical heating element 58 which has a spiral portion 60 extending around the melt bore 52 and an external terminal 62 to which a power source is connected. The nozzle 14 is seated in a well 64 in the cavity plate 26 with a cylindrical locating flange 66 received in a circular locating seat 68 in the well 64. This provides an insulative air space 70 between the heated nozzle 14 and the surrounding cooled cavity plate 26. A thermocouple element 72 extends through this air space 70 and into the front end 50 of the nozzle 14 to monitor the operating temperature.

Figure 2:
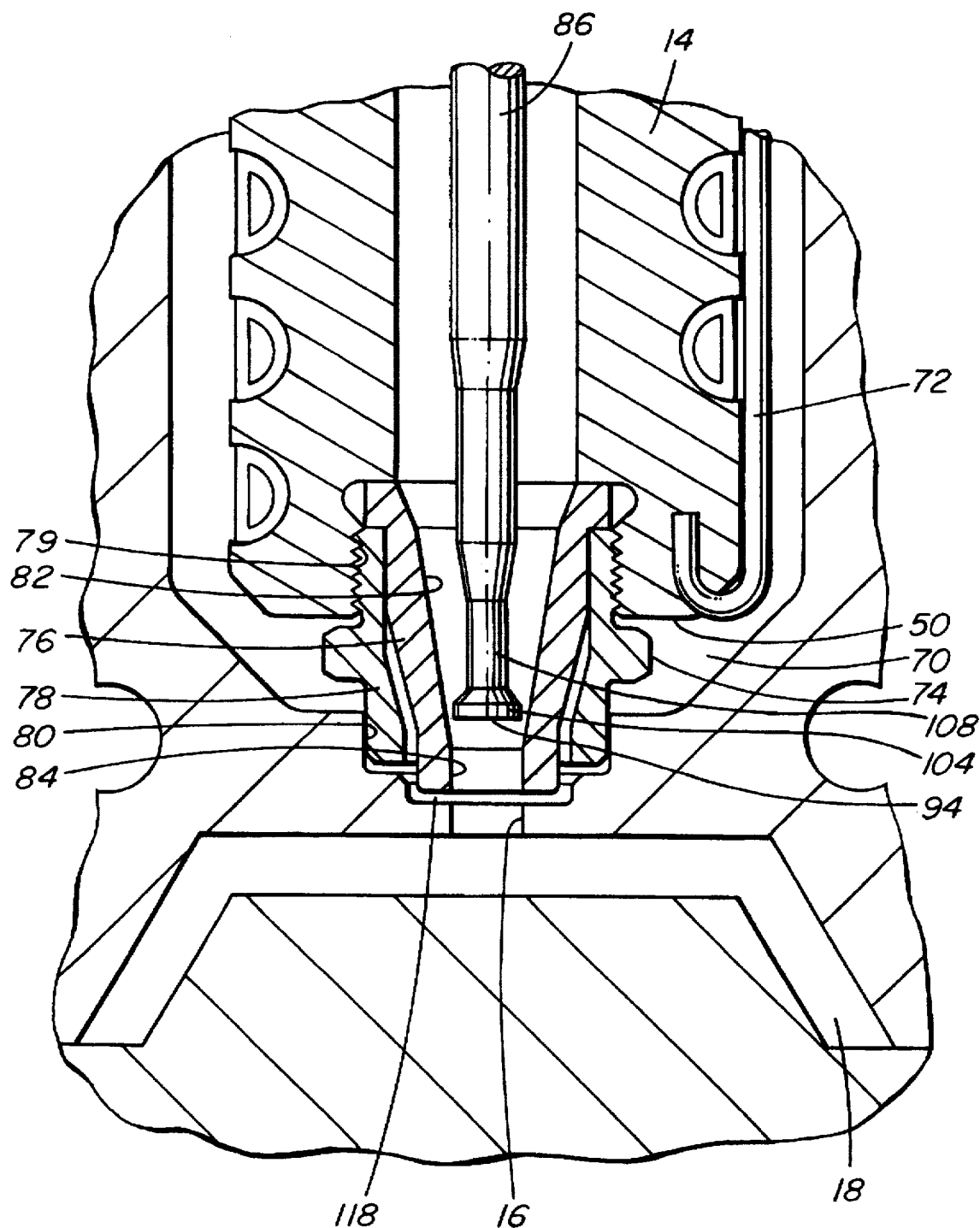
FIG. 2 is a sectional view of a portion of the apparatus shown in FIG. 1 showing the valve member in a partially closed position.

As best seen in FIG. 2, the front end 50 of the nozzle 14 is accurately located by a two-piece nozzle seal 74 which extends across this air space 70 around the gate 16. A hollow inner piece 76 is secured in place by a removable hollow outer piece 78 which is screwed into a seat 79 in the front end 50 of the nozzle 14. The outer piece 78 extends into a matching cylindrical seat 80 around the gate 16 to maintain accurate alignment. The inner piece 76 is made of a highly thermally conductive material such as a beryllium copper alloy and the outer piece 78 is made of less conductive material such as a titanium alloy. The inner piece 76 has an inner surface 82 which tapers inwardly to connect the melt bore 52 through the nozzle 14 with the gate 16. While it is difficult to show, in this embodiment, a front portion 84 of the inner surface 82 and the gate 14 both have a slight inward taper of approximately 4°.

An elongated valve member 86 extends through a bore 88 in the sealing bushing 38 and a bore 90 through the manifold 12 centrally into the aligned melt bore 52 through the nozzle 14. According to this embodiment of the invention, the valve member 86 has an enlarged rear end 92 and a front end 94 which is received in the gate 16 in the forward closed position. The rear end 92 of the valve member 86 is connected to pneumatic actuating mechanism which includes a piston 96 seated in a cylinder 98 in the cylinder plate 28. Controlled air pressure is applied to opposite sides of the piston 96 through air ducts 100, 102 extending through the back plate 30 to reciprocate the valve member between a retracted open position and the forward closed position shown in FIG. 1. While a pneumatic actuating mechanism is shown for ease of illustration, of course hydraulic actuating mechanisms are used for many applications.

Figure 3:
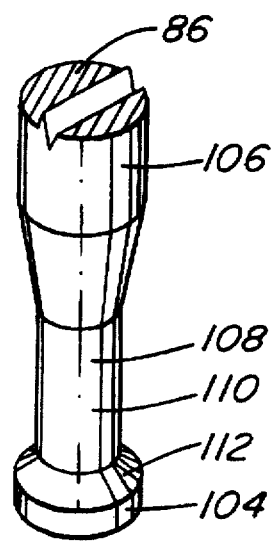
FIG. 3 is an isometric view of the front end of the valve member seen in FIG. 1.

As best seen in FIGS. 2 and 3, the elongated valve member 86 has a cylindrical head portion 104 connected to a cylindrical stem portion 106 by a neck portion 108. The head portion 104 has a diameter to fit in the gate 16 and in this embodiment the diameters of the head portion 104 and the stem portion 106 are the same. As described below, the head portion 104 is short and the neck portion 108 is substantially smaller in cross-sectional area than the head portion 104 to facilitate the backflow of melt as the valve member 86 closes. In the embodiment shown in FIGS. 1–3, the neck portion 108 is circular in cross-section and has an outer surface 110 with a portion 112 which tapers outwardly to be the same diameter as the head portion 104 where the neck portion 108 and the head portion 104 join.

In use, the injection molding system is assembled as shown in FIG. 1. While only a single cavity 18 has been shown for ease of illustration, it will be appreciated that the melt distribution manifold 12 normally has many more melt passage branches extending to numerous cavities 18 depending on the application. Electrical power is applied to the heating element 24 in the manifold 12 and to the heating elements 58 in the nozzles 14 to heat them to a predetermined operating temperature. Hot pressurized melt is then injected from a molding machine (not shown) into the melt passage 10 through a central inlet 114 according to a predetermined cycle in a conventional manner. The melt passage branches outward in the manifold 12 to each nozzle 14 where it extends through the central bore 52 and then through the aligned opening 116 in the two-piece nozzle seal 74 to the respective gate 16. In this embodiment, controlled pneumatic pressure is applied to the cylinders 98 through air ducts 100, 102 to control actuation of the pistons 96 and valve members 86 according to a predetermined cycle in a conventional manner. When the valve members 86 are in the open position retracted further than shown in FIG. 2, the pressurized melt flows through the melt passage 10 and the gates 16 until the cavities 18 are full. When the cavities 18 are full, injection pressure is held momentarily to pack. The pneumatic pressure is then reversed to reciprocate the valve member 80 to the forward closed position in which the head portion 104 of each of the valve members 86 is seated in one of the gates 16. Reference is now made to FIG. 2 which shows the forwardly moving valve member 86 in the partially closed position. As the valve member 86 is driven forwardly pressure builds up in the cavity 18. It has been found that using a valve member 86 with a smaller neck portion 108 leading to a short cylindrical head portion 104 increases back flow of the melt around the head portion 104 and alleviates the build up of back pressure in the cavity 18 considerably. While the head portion 104 must be longer than the gap 118 in front of the inner piece 76 of the nozzle seal 74, it is preferably shorter than one-half its diameter to limit the length of melt flow constriction around it. After the gates 16 are closed, injection pressure is released and, after a short cooling period, the mold is opened for ejection. After ejection, the mold is closed, pneumatic pressure is applied to retract the valve members 86 to the open position and melt injection pressure is reapplied to refill the cavities 18. This cycle is repeated continuously every few seconds with a frequency depending upon the number and size of the cavities and the type of material being molded.

Figure 4:
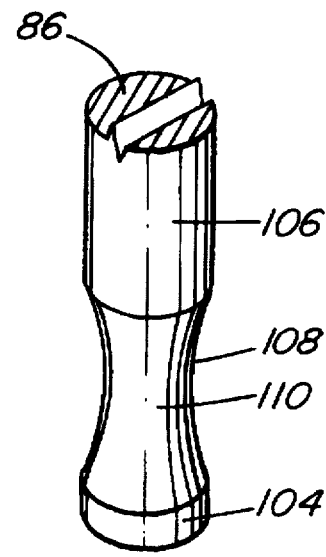
FIG. 4 is an isometric view of the front end of a valve member according to another embodiment of the invention.

The embodiment of the invention seen in FIG. 4 is the same as that described above except that the outer surface 110 of the neck portion 108 is smoothly curved. This provides for somewhat smoother flow of the melt around it and thus reduces stress for molding a material with which stress is a concern.

Figure 5:
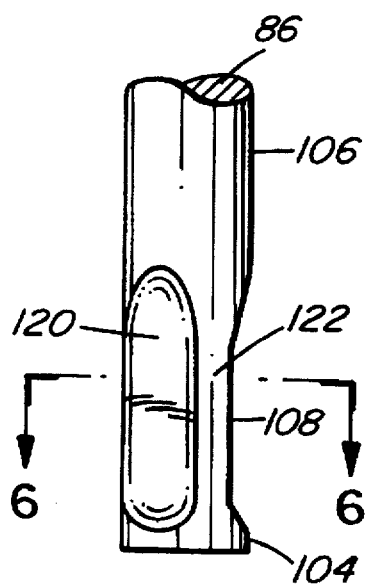
FIG. 5 is an isometric view of the front end of a valve member according to a further embodiment of the invention.
Figure 6:
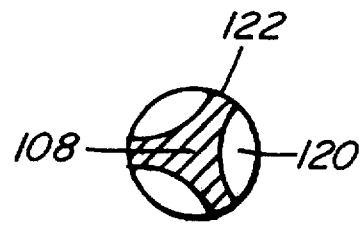
FIG. 6 is a sectional view taken along line 6—6 in FIG. 5.

The embodiment shown in FIGS. 5 and 6 is significantly different from those described above in that the neck portion 108 is formed by a number of longitudinally extending flutes 120 equally spaced around the valve member 86. As best seen in FIG. 6, the flutes 120 form an equal number of lands 122 extending between them. While the flutes 120 give the neck portion 108 a smaller cross-sectional area than the head portion 104, the lands 122 provide the valve member 86 with additional strength and ensure there are no alignment problems in the gate 16. In this embodiment, the flutes 120 have a concave cross-section to enhance the backflow of the melt through them during closure of the valve member 86. Although the valve member 86 is shown having three flutes 120 and three lands 122, the number can be different in other embodiments.

While the description of the valve member with a head portion and a small neck portion has been given with respect to preferred embodiments, it will be evident that various modifications are possible without departing from the scope of the invention as understood by those skilled in the art and as defined in the following claims. For instance, the shape and relative size of the flutes 120 and lands 122 can be different for different applications.

The embodiments of the invention in which an exclusive property or privilege is claimed is defined as follows:

1. In a valve gated injection molding apparatus to convey melt to a gate extending through a mold to a cavity comprising a heated nozzle seated in the mold, the nozzle having a rear end, a front end, and a melt bore extending therethrough from the rear end to the front end in alignment with the gate, an elongated valve member having a front end mounted to extend centrally in the melt bore through the nozzle, and valve member actuating means connected to the valve member whereby the valve member is reciprocated between a retracted open position wherein the melt flows from the melt bore through the gate into the cavity and a forward closed position wherein the front end of the valve member is seated in the gate, the improvement wherein;

the elongated valve member has a cylindrical stem portion, a short cylindrical head portion with a uniform diameter at the front end, and a neck portion extending rearwardly from the head portion to the cylindrical stem portion, the stem portion having a diameter at least as large as the cylindrical head portion and the neck portion being substantially smaller in cross-sectional area than the head portion.

2. A valve gated injection molding apparatus as claimed in claim 1 wherein the neck portion is circular in cross-section with a diameter which increases gradually towards the head to be the same diameter as the head portion where the neck portion and head portion join.

3. A valve gated injection molding apparatus as claimed in claim 2 wherein the head portion has a length of less than one half the diameter of the head portion.

4. A valve gated injection molding apparatus as claimed in claim 1 wherein the valve member has a uniform diameter with the neck portion formed by a plurality of longitudinally extending flutes equally spaced around the neck portion to provide a plurality of longitudinally extending lands extending between the flutes.

* * * * *